United States Patent
Suzuki

[15] 3,669,835
[45] June 13, 1972

[54] PROCESS FOR PREPARING VITAMIN $B_2$-GLUCOSIDE

[72] Inventor: Yukio Suzuki, Kurashiki, Japan

[73] Assignee: Hayashibara Company, Okayama-shi, Okayama, Japan

[22] Filed: April 14, 1970

[21] Appl. No.: 28,511

[52] U.S. Cl. ............................................195/28 R, 195/62
[51] Int. Cl. ...........................................................C12d 5/04
[58] Field of Search...................................................195/28

[56] References Cited
OTHER PUBLICATIONS

Whitby, Biochemical Journal, Vol. 50, Pages 433–438, (1952)

*Primary Examiner*—Alvin E. Tanenholtz
*Attorney*—Browdy and Neimark

[57] ABSTRACT

The present invention relates to a process for preparing vitamin $B_2$-glucoside starting from a oligosaccharide having a glucoside linkage, such as maltose, liquefied starch or sucrose and the like, as the raw material using the microbial cell or the enzyme contained therein (trans glucosidase) of the species of *Mucor*.

6 Claims, No Drawings

PROCESS FOR PREPARING VITAMIN $B_2$-GLUCOSIDE

The present invention relates to a process for preparing vitamin $B_2$-glucoside starting from oligosaccharide having a glucoside linkage, such as maltose, liquefied starch or sucrose and the like, as the raw material using the microbial cell or the enzyme contained therein (trans glucosidase) of a species of *Mucor*.

Vitamin $B_2$ was isolated by Kuhn in 1933 as a yellow crystalline pigment. The said vitamin has been regarded as a significant growth factor for animals, being synthesized by a biochemical method since then but now prepared exclusively by a chemical synthesis.

A tremendous amount of vitamin $B_2$ has been adopted as a medicine, an edible dye and also utilized as a food additive for domestic animals. However its solubility in water is extremely low, requiring a number of devices in order to overcome the difficulty in direct application. In contrast, vitamin $B_2$-glucoside which possesses the same functions as vitamin $B_2$ is water-soluble and so the industrial preparation thereof has been desired.

The said vitamin $B_2$-glucoside was discovered by L. G. Whitby in 1952 as a novel derivative of vitamin $B_2$ in the course of studies on metabolism of the vitamin; it has been revealed to play an important role in the material metabolic system in the living body (L. G. Whitby, The Biochemical Journal, Vol. 50, p.433, 1952).

Since the report of L. G. Whitby, the vitamin $B_2$-glucoside-producing enzyme (trans-glucosidase, i.e. the glucoside transfer enzyme effecting transfer of the glucoside group in a diose to vitamin $B_2$) has been studied by many investigators and hitherto revealed to be distributed widely in plant and animal tissues and in microorganisms. However the activity of the enzyme except that existing in Leuconostoc has been found to be rather low.

A process for producing said vitamin $B_2$-glucoside utilizing the bacteria which refers to Leuconostoc has been proposed (Vitamin, Vol. 23, p. 74, 1961; Journal of Vitaminology, Vol. 9, p. 285, 1963; patent specification No. 412,079) which comprises inoculating and cultivating the said bacteria in culture media containing sucrose and vitamin $B_2$, or treating a solution of sucrose and vitamin $B_2$ with the culture broth filtrate of the said bacteria, microbial cells or the enzyme isolated therefrom to obtain the desired product in high yield. Nevertheless, the separation of the desired product has been rather difficult due to formation of polysaccharide inevitably as by-products.

In consequence of an extensive study on the process for preparing vitamin $B_2$-glucoside, the present inventor has been able to achieve an efficient novel process for preparing the said vitamin $B_2$-glucoside in high yield based on the findings that the microorganisms of Mucor species effect glucoside transfer from maltose or liquefied starch and the like to vitamin $B_2$ during the course of growth. The same glucoside transfer from maltose or liquefied starch to vitamin $B_2$ takes place likewise on using the culture broth filtrate of the said microorganisms, cell extract or the enzyme isolated therefrom. The activity of said microorganism were found to be extremely high, and no appreciable amount of contaminants such as polysaccharide were accumulated during the process.

The molds to be utilized in the present invention include the strains of *Mucor javanicus* IFO 4569, 4570, IAM 6101, 6087, *Mucor racemosus* IAM 6123, IFO 4581, *Mucor rouxianus* IFO 5773, IAM 6131, *Mucor mucedo* IFO 5776 and the like, all belong to the genus of *Mucor*.

The present invention can be realized by inoculating one of the above species of microorganisms into a usual culture medium containing nitrogen source, and various mineral salts added with a diose or polysaccharide such as maltose, liquefied starch and a solution or suspension of vitamin $B_2$ followed by cultivating with or without shaking.

In accord with the growth of the mold, the vitamin $B_2$ in the culture medium will be converted into vitamin $B_2$-glucoside with a conversion of 40–95 percent on cultivation with shaking for 2–4 days, and 40–90 percent on cultivation without shaking for 7–10 days.

As mentioned above, the present invention can also be realized by using the culture broth filtrate, microbial cells or the enzyme isolated therefrom.

The present invention will be further illustrated by the following examples.

EXAMPLE 1

To 50 ml of a culture medium comprising maltose 4 percent, ammonium nitrate 0.1 percent, potassium dihydrogen phosphate 0.1 percent, potassium chloride 0.05 percent, calcium carbonate 1 percent (sterilized by heating separately and added during inoculation) was added vitamin $B_2$ 25 mg, and inoculated with *Mucor javanicus* IFO 4569, incubated at 30° C for 2 days with shaking to accumulate 32.8 mg of vitamin $B_2$-glucoside and minor amount of vitamin $B_2$-oligosaccharide. The yield of the vitamin $B_2$-glucoside versus the used vitamin $B_2$ was 92.0 percent. The product was adsorbed on Florisil column, eluted with an aqueous pyridine solution, precipitated with ethanol after concentration to give crystals of the glucoside.

EXAMPLE 2

In place of *Mucor javanicus*, the strain of *Mucor racemosus* IAM 6123 was used and cultivated in 50 ml of the same culture medium as described in Example 1 to which 15 mg of vitamin $B_2$ had been added. On cultivation at 30° C for 3 days with shaking afforded 18.3 mg of vitamin $B_2$-glucoside. The yield was 85.0 percent.

EXAMPLE 3

To 50 ml of the same culture medium as given in Example 1 was added 15 mg of vitamin $B_2$, and subsequently, inoculated with Mucor javanicus IFO 4570, cultivated at 30° C for 10 days without shaking; affording 18.5 mg of vitamin $B_2$-glucoside. The yield was 86.5 percent.

EXAMPLE 4

*Mucor rouxianus* IAM 6131 was used instead of *Mucor racemosus;* cultivation of the mold in the same condition ad adopted in Example 3 for 7 days without shaking afforded 16.0 mg of vitamin $B_2$-glucoside. The yield was 75.0 percent.

EXAMPLE 5

*Mucor javanicus* was inoculated into 100 ml of a culture medium comprising glucose 3 percent, ammonium nitrate 0.1 percent, sodium nitrate 0.1 percent, potassium dihydrogen phosphate 0.1 percent, potassium chloride 0.05 percent and calcium carbonate 1 percent previously sterilized by heating separately (to be added during the inoculation), cultivated at 30° C for 7 days without shaking. The microbial cells were collected and a 25 ml cell suspension was prepared therefrom with or without grinding, added to a solution containing maltose 10 g, vitamin $B_2$ 20 mg, 0.05 M acetate buffer (P.H 4.6) 25 ml, a small amount of toluene and made up to 100 ml with pure water, incubated at 45° C for 24 hours which resulted in 36.9 mg of vitamin $B_2$-glucoside and a small amount of vitamin $B_2$-oligosaccharide.

EXAMPLE 6

Mucor javanicus IAM 6101 was inoculated into 100 ml of a culture medium comprising powdered corn starch 2 percent, ammonium sulfate 0.2 percent, potassium dihydrogen phosphate 0.1 percent, ferrous sulfate 0.001 percent, calcium carbonate (sterilized previously and added to the medium during the inoculation), cultivated at 30° C for 2 days with shaking; the culture broth after removal of the microbial cells was used as the enzyme source. On incubating the reaction mixture containing liquefied starch 10 g, vitamin $B_2$ 30 mg, 0.05 M acetate buffer (P.H 4.6) 25 ml, enzyme liquor 50 ml, a small amount of toluene made up to 100 ml with pure water at 45° C for 24 hours, 31.0 mg of vitamin $B_2$-glucoside was obtained, amounting to a yield of 74.0 percent.

EXAMPLE 7

After addition of 15 mg vitamin $B_2$-glucoside to 50 percent culture medium with a composition of 3 percent dextrin, 0.1 percent ammonium nitrate, 0.1 percent sodium nitrate, 0.1 percent potassium phosphate, 0.05 percent potassium chloride, 1 percent calcium carbonate (which was separately sterilized by dry heating beforehand, and added at inoculation), strains of *Mucor racemosus* IAM 6123 were inoculated on the medium and subjected to shaking cultivation at 30° C for a period of 3 days to form 7.7 mg vitamin $B_2$-glucoside. Yield was 35.7 percent.

EXAMPLE 8

As a substitute for strains of *Mucor racemosus*, strains of *Mucor rouxianus* IAM 6131 (ATCC mucor ouxic) were used and cultivated under the conditions similar to Example 7. Subsequently, 6.5 mg vitamin $B_2$-glucoside was formed with a yield of 30.0 percent.

EXAMPLE 9

On a 50 ml culture medium comprising 4 percent potato starch, 0.1 percent ammonium nitrate, 0.1 percent sodium nitrate, 0.1 percent potassium phosphate, 0.05 percent potassium chloride, 0.1 percent polypeptone, 1 percent calcium carbonate (which was separately sterilized beforehand, and added at inoculation) were added strains of *Mucor javanicus* IFO 4569. After shaking cultivation at 30° C, for a period of 4 days, the resultant cells were treated with ultra sonics. A reaction mixture was prepared by diluting the following in pure water to be a total volume of 100 ml; 5 g soluble starch, 30 mg vitamin $B_2$, 33 ml 0.05 M acetic acid buffer (P.H 4.6), 25 ml ultra sonic treated cell dispersion. The reaction mixture was shaken at 37° C for 6 hours. From the reaction mixture 10.7 mg of vitamin $B_2$-glucoside was obtained. The yield was 25.0 percent.

EXAMPLE 10

In replacement of starch, sucrose was used. Cells were collected under the conditions described in Example 9. Reaction was carried out similarly as in Example 9. 12.1 mg vitamin $B_2$-glucoside was obtained and the yield was 28.3 percent.

It will be obvious to those skilled in the art that various changes may be made without departing from the scope of the invention and the invention is not to be considered limited to what is described in the specification.

What is claimed is:

1. A process for preparing vitamin $B_2$-glucoside which comprises treating a solution containing vitamin $B_2$ and an oliogosaccharide selected from the group consisting of maltose, sucrose, and liquefied starch with the transglucosidase enzyme isolated from a species of *Mucor*.

2. A process according to claim 1, wherein the said isolated enzyme from a species of *Mucor* is produced by inoculating and cultivating the species of *Mucor* in culture media containing said oligosaccharide.

3. A process according to claim 1, wherein the said enzyme isolated from a species of *Mucor* is a fungous enzyme produced by cultivating the species of Mucor in usual culture media.

4. A process according to claim 1, wherein the said enzyme isolated from a species of *Mucor* is the enzyme solution obtained from the culture broth filtrate produced by cultivating the species of *Mucor*.

5. A process according to claim 1 wherein the said enzyme isolated from a species of *Mucor* is the fungus produced by cultivating the species of *Mucor* and the transfer enzyme separated from the culture broth filtrate.

6. A process according to claim 1, wherein said species of *Mucor* is one of the *Mucor* species of *Mucor* javanicus (IFO 4569, 4570, IAM 6101, 6087), *Mucor racemosus* (IFO 4581, IAM 6123), *Mucor rourianus* (IFO 5773, IAM 6131), and *Mucor mucedo* (IFO 5776).

* * * * *